United States Patent
Han et al.

(10) Patent No.: US 11,673,496 B1
(45) Date of Patent: Jun. 13, 2023

(54) TARGETED OCCUPANT THERMAL COMFORT BASED ON SEAT BELT

(71) Applicant: GM GLOBAL TECHNOLOGY OPERATIONS LLC, Detroit, MI (US)

(72) Inventors: Taeyoung Han, Bloomfield Hills, MI (US); Shailendra Kaushik, Novi, MI (US); Alok Warey, Novi, MI (US); Chih-Hung Yen, Bloomfield Hills, MI (US); Bahram Khalighi, Holladay, UT (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/697,444

(22) Filed: Mar. 17, 2022

(51) Int. Cl.
| | | |
|---|---|---|
| *F25B 21/02* | (2006.01) | |
| *B60H 1/00* | (2006.01) | |
| *B60N 2/56* | (2006.01) | |
| *B60R 22/12* | (2006.01) | |

(52) U.S. Cl.
CPC ......... *B60N 2/5657* (2013.01); *B60N 2/5628* (2013.01); *B60N 2/5685* (2013.01); *B60N 2/5692* (2013.01); *B60R 22/12* (2013.01)

(58) Field of Classification Search
CPC ...... B60N 2/5657; B60N 2/5628; B60R 22/12
See application file for complete search history.

(56) References Cited

U.S. PATENT DOCUMENTS

| | | | | |
|---|---|---|---|---|
| 3,050,734 | A * | 8/1962 | Dopyera | A41F 15/007 224/264 |
| 3,820,842 | A * | 6/1974 | Stephenson | B60R 21/18 297/483 |
| 5,450,894 | A * | 9/1995 | Inoue | B60H 1/00842 454/907 |
| 6,082,763 | A * | 7/2000 | Kokeguchi | B60R 21/201 280/801.1 |
| 7,320,223 | B1 * | 1/2008 | Dabney | B60N 2/2845 62/3.61 |
| 9,272,647 | B2 * | 3/2016 | Gawade | B60N 2/5692 |
| 9,950,589 | B2 * | 4/2018 | Sagou | B60H 1/00735 |
| 10,189,434 | B1 * | 1/2019 | Casaburo | G01C 21/3664 |
| 10,279,646 | B2 * | 5/2019 | Arens | F25B 21/04 |
| 10,479,162 | B2 * | 11/2019 | Elson | B60H 1/2225 |
| 10,821,802 | B2 * | 11/2020 | Mazzocco | B60H 1/00885 |
| 10,981,433 | B2 | 4/2021 | Kaushik et al. | |
| 11,167,672 | B2 * | 11/2021 | Hoshi | B60N 2/5657 |
| 11,285,910 | B2 * | 3/2022 | Niebling | B60R 22/12 |
| 11,376,924 | B2 * | 7/2022 | Imaizumi | B60H 1/00285 |
| 2008/0006036 | A1 * | 1/2008 | Askew | F24F 5/0042 62/3.5 |
| 2008/0303252 | A1 * | 12/2008 | Ohhashi | D04B 21/16 280/733 |
| 2009/0096200 | A1 * | 4/2009 | Jamison | B60R 22/12 297/474 |
| 2015/0048658 | A1 * | 2/2015 | Gawade | B60N 2/5678 297/180.12 |
| 2016/0303943 | A1 * | 10/2016 | Arens | B60N 2/5657 |

(Continued)

*Primary Examiner* — Shin H Kim

(57) ABSTRACT

A seat system includes a seat bottom and a seat back at a rear of the seat bottom. A thermally controlled seat belt includes a lap portion and a shoulder portion. The thermally controlled seat belt can include a porous sleeve that is connected to a seat ventilation system or a vehicle ventilation system. The seat belt can alternatively or additionally include a heating fabric or thermoelectric elements.

6 Claims, 2 Drawing Sheets

(56) References Cited

U.S. PATENT DOCUMENTS

2018/0056835 A1* 3/2018 Konrad ............... B60N 2/5692
2019/0371995 A1* 12/2019 Tait .................... B60N 2/5642
2020/0031259 A1* 1/2020 Hoppe ................. D03D 1/0088

* cited by examiner

TARGETED OCCUPANT THERMAL COMFORT BASED ON SEAT BELT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a targeted occupant thermal comfort system and more particularly to a thermally controlled seat belt.

Passenger comfort is an important aspect of vehicle design. Vehicles are commonly operated at temperatures ranging from well below 0° F. to over 100° F. At these temperatures, it is desirable to provide alternative heating and cooling systems that allow a passenger to be comfortable regardless of the outdoor temperatures and that the alternative heating and cooling systems operate efficiently.

SUMMARY

According to an aspect of the present disclosure, a seat system includes a seat bottom and a seat back at a rear of the seat bottom. A thermally controlled seat belt includes a lap portion configured to extend over a lap of a passenger seated on the seat bottom and a shoulder portion configured to extend over a shoulder of the passenger.

According to a further aspect of the present disclosure, the thermally controlled seat belt includes a porous sleeve connected to a ventilation system.

According to a further aspect of the present disclosure, the ventilation system includes a heater and/or a cooler.

According to a further aspect of the present disclosure, the ventilation system includes a seat ventilation system that provides ventilation to at least one of the seat bottom and the seat back.

According to a further aspect of the present disclosure, the ventilation system includes a vehicle passenger compartment ventilation system.

According to a further aspect of the present disclosure, the porous sleeve includes pores that open in a direction toward a seat occupant.

According to a further aspect of the present disclosure, the thermally controlled seat belt includes a control unit for activating the thermally controlled seat belt based upon a vehicle passenger compartment temperature.

According to a further aspect of the present disclosure, the thermally controlled seat belt includes a plurality of thermoelectric elements mounted to the strap, the thermoelectric elements being connected to a power supply. A power controller adjusts an amount of power delivered to the thermoelectric elements from the power supply.

According to a further aspect of the present disclosure, the thermally controlled seat belt includes a heating fabric that is connected to a power supply. A power controller adjusts an amount of power delivered to the thermoelectric elements from the power supply.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
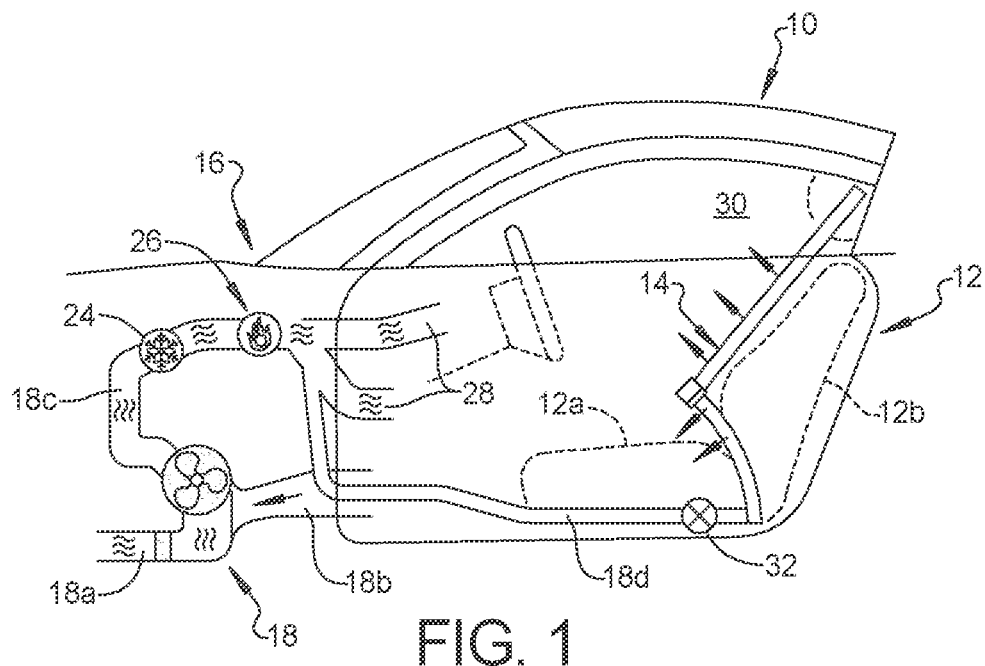
FIG. 1 is a schematic view of a vehicle seat system having a thermally controlled seat belt connected to the vehicle ventilation system according to the principles of the present disclosure.

With reference to FIG. 1, a vehicle 10 is shown including a seat 12 having a seat bottom 12a, a seat back 12b and a thermally controlled seat belt 14 according to the principles of the present disclosure. The vehicle 10 includes a ventilation system 16 having a duct system 18 with an external air inlet portion 18a and an internal air inlet 18b each connected to a fan 24. A cooling coil 24 and heating coil 26 are provided in the duct 18c downstream of the fan 22 and the duct 18c is connected to air vents 28 inside a passenger compartment 30. An additional duct 18d is connected to the thermally controlled seat belt 14 for delivering air from the vehicle ventilation system 16 to the thermally controlled seat belt. A valve 32 can be provided in the duct 18d to control an amount of air delivered to the thermally controlled seat belt 14 from the vehicle ventilation system 16. The thermally controlled seat belt 14 can be made from a sleeve having a plurality of pores 34 (best shown in FIG. 2) that direct the ventilation air at a passenger in the seat 12. The pores 34 can optionally be disposed on an interior side of the seat belt 14, along edges of the seat belt 14 and on an exterior side of the seat belt 14 and combinations thereof.

The thermally controlled seat belt 14 according to the principles of the present invention can be controlled according to various techniques. In the embodiment of FIG. 1, the vehicle ventilation system 16 is operated according to known operating conditions either manually controlled by the passenger or automatically controlled based upon the temperature of the passenger compartment 30. The valve 32 can be manually or automatically controlled to deliver heating or cooling air to the thermally controlled seat belt 14.

Figure 2:
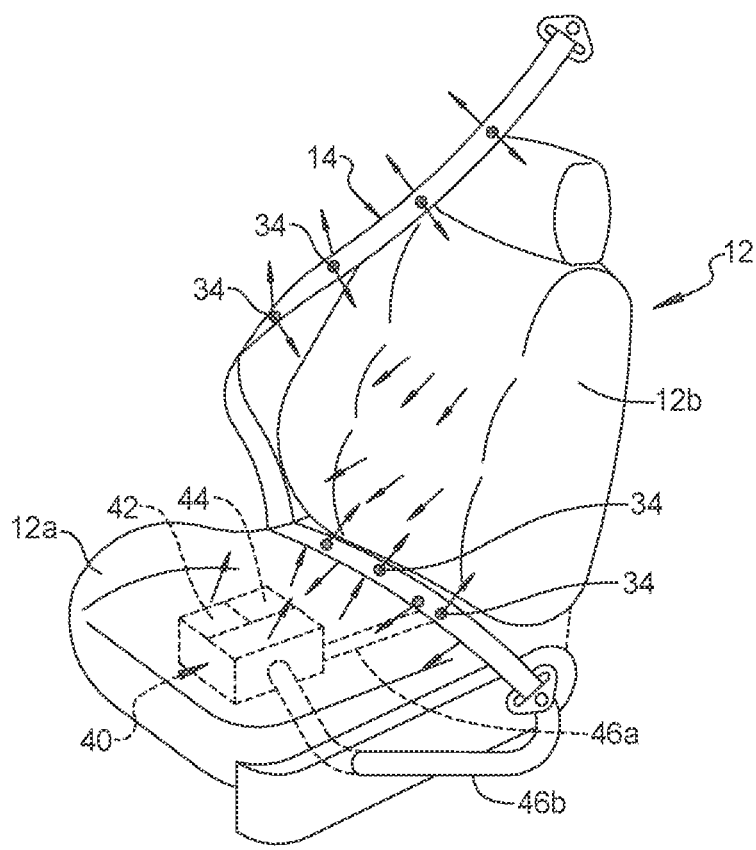
FIG. 2 is a schematic view of a vehicle seat system having a thermally controlled seat belt connected to a seat ventilation system according to the principles of the present disclosure.

In an alternative embodiment as shown in FIG. 2, the seat 12 includes a ventilation system 40 that can have a cooling coil 42 and/or a heating coil 44 in communication with a duct 46a that can distribute cooled or heated air to the seat bottom 12a and 12b. A duct 46b is connected to the thermally controlled seat belt 14 for delivering air from the seat ventilation system to the thermally controlled seat belt 14. A valve 48 can be provided in the duct 46b to control an amount of air delivered to the thermally controlled seat belt 14 from the seat ventilation system 40. The thermally controlled seat belt 14 can be made from a sleeve having a plurality of pores 34 that direct the ventilation air at a passenger in the seat 12. The pores 34 can optionally be disposed on an interior side of the seat belt 14, along edges of the seat belt 14 and on an exterior side of the seat belt 14 and combinations thereof.

In the embodiment of FIG. 2, the seat ventilation system 40 is operated according to known operating conditions either manually controlled by the passenger or automatically controlled based upon the temperature of the passenger compartment 30 to deliver heating or cooling air to the thermally controlled seat belt 14.

Figure 3:
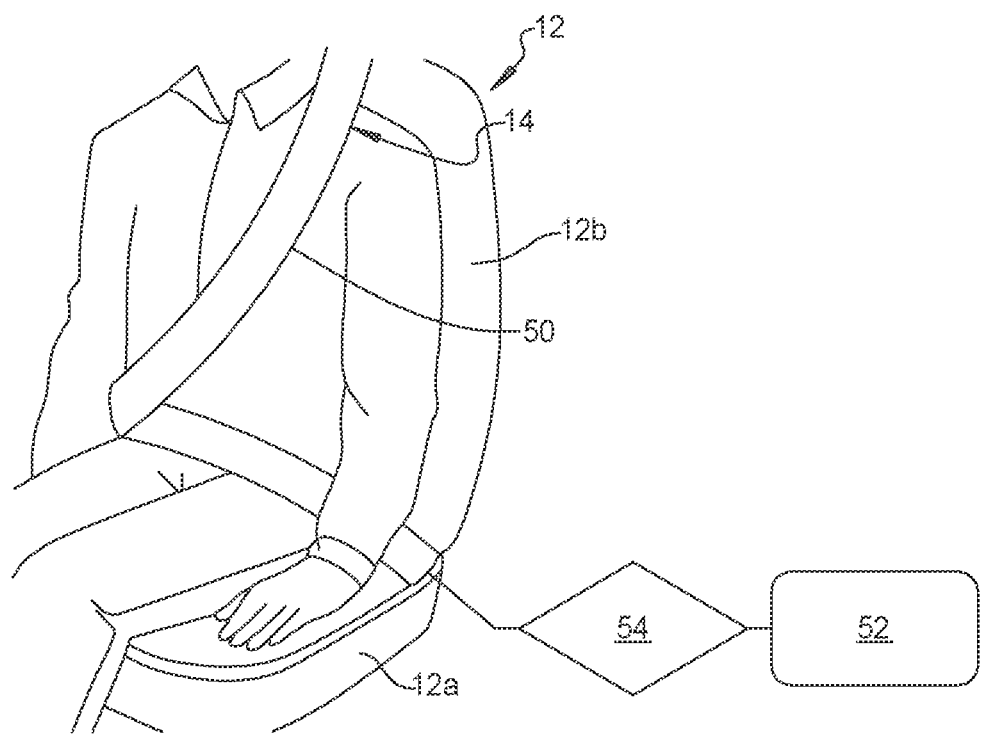
FIG. 3 is a schematic view of a vehicle seat system having a thermally controlled seat belt with a heated fabric.

In yet another embodiment as shown in FIG. 3, the thermally controlled seat belt 14 can include a heating fabric 50. The heating fabric 50 can be connected to a power supply 52 by a power control unit 54. As the heating fabric 50 is provided with an electric current from the power control unit 54, the heating fabric 50 heats up. There are various types of flexible fabric heating materials available. In particular, the heating fabric 50 can include, but is not limited to, a PTC film 50 that is a flexible and can be disposed in the seat belt sleeve 14 or as a layer attached to a seat belt web material. PTC films 50 are known to have the ability to adjust and control temperatures by electric resistance heating upon delivery of an alternating or direct current. With known PCT films, the resistivity grows exponentially with increasing temperature up to a set temperature where it ceases to conduct electricity. Therefore, the PCT films do not exceed a set temperature as the resistance increase and the power applied approaches zero. The heating fabric 50 can be used separate from or in combination with the vehicle or seat ventilation systems so that, for example, the heating fabric 50 can supply heat and the seat or vehicle ventilation system can supply cooling. The operation of the thermally controlled seat belt 14 having a heating fabric 50 can be manually or automatically controlled based upon a temperature of the passenger compartment.

Figure 4:
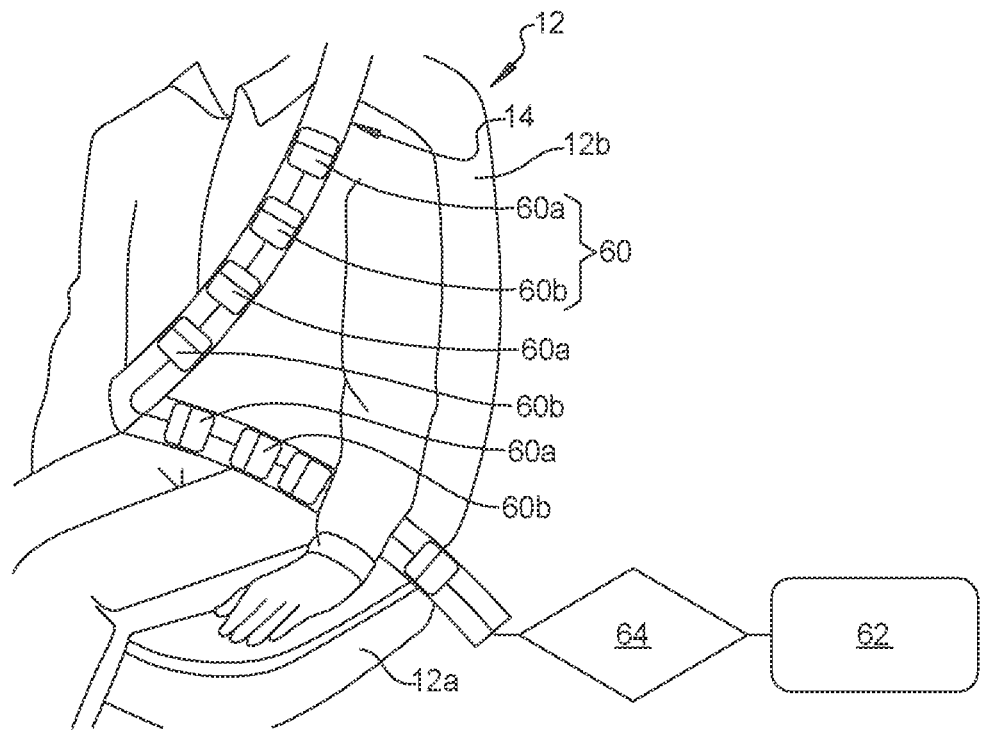
FIG. 4 is a schematic view of a vehicle seat system having a thermally controlled seat belt with thermoelectric elements on the seat belt.

In still another embodiment as shown in FIG. 4, the thermally controlled seat belt 14 can include thermoelectric units 60 mounted thereon. The thermoelectric units 60 operate by the Peltier effect. The device has two sides, and when a DC electric current flows through the device, it brings heat from one side to the other, so that one side gets cooler while the other gets hotter. The thermoelectric units 60 can be connected to a power supply 62 by a power control unit 64. As the thermoelectric units 60 are provided with an electric current from the power control unit 64, the thermoelectric units 60 heat up. The thermoelectric units 60 can be used separate from or in combination with the vehicle or seat ventilation systems so that, for example, the thermoelectric units 60 can supply heat and the seat or vehicle ventilation system can supply cooling. Alternatively, the thermoelectric units 60 can be alternated so that a cooling side of a thermoelectric unit 60a is facing the passenger and adjacent ones of the thermoelectric units 60b have their heating side facing the passenger so that when heating is needed, the thermoelectric units 60b are activated by the power control unit 64 and when cooling is needed, the thermoelectric units 60a are activated by the power control unit 64. The operation of the thermally controlled seat belt 14 having thermoelectric units 60 can be manually or automatically controlled based upon a temperature of the passenger compartment.

Although the seat system of the present disclosure is described in a context of a vehicle seat, it should be understood that the present inventive concepts can be applied to various seats used in trains, planes, boats, lounge chairs, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A seat system comprising:
    a seat bottom;
    a seat back at a rear of the seat bottom;
    a thermally controlled seat belt having a lap portion configured to extend over a lap of a passenger seated on the seat bottom and a shoulder portion configured to extend over a shoulder of the passenger, wherein the thermally controlled seat belt includes a plurality of Peltier effect thermoelectric elements mounted to the strap, the thermoelectric elements being connected to a power supply, wherein the thermoelectric elements have a heating side and a cooling side, and wherein when a DC electric current flows through the thermoelectric elements, it brings heat from the cooling side to the heating side, wherein the thermoelectric units are alternated so that a cooling side of a thermoelectric unit is facing the passenger and adjacent ones of the thermoelectric units have their heating side facing the passenger;
    a power controller for adjusting an amount of power delivered to the thermoelectric elements from the power supply, wherein when heating is needed, the thermoelectric units with a heating side facing the passenger are activated by the power controller and when cooling is needed, the thermoelectric units with a cooling side facing the passenger are activated by the power controller.

2. The seat system according to claim 1, wherein the thermoelectric elements are at spaced positions along the lap portion of the seat belt.

3. The seat system according to claim 1, wherein the thermoelectric elements are at spaced positions along the shoulder portion of the seat belt.

4. The seat system according to claim 1, wherein the seat bottom includes a seat ventilation system.

5. The seat system according to claim 4, wherein the seat back includes a seat ventilation system.

6. The seat system according to claim 1, wherein operation of the thermoelectric units is automatically controlled based upon a temperature of a passenger compartment.

* * * * *